United States Patent [19]

Mori

[11] Patent Number: 4,951,795
[45] Date of Patent: Aug. 28, 1990

[54] MODULATION VALVE DEVICE

[75] Inventor: Mitsuyoshi Mori, Neyagawa, Japan

[73] Assignee: Kabushiki Kaisha Daikin Seisakusho, Neyagawa, Japan

[21] Appl. No.: 275,174

[22] PCT Filed: Feb. 29, 1988

[86] PCT No.: PCT/JP88/00224

§ 371 Date: Sep. 2, 1988

§ 102(e) Date: Sep. 2, 1988

[87] PCT Pub. No.: WO88/07145

PCT Pub. Date: Sep. 22, 1988

[30] Foreign Application Priority Data

Mar. 10, 1987 [JP] Japan ................... 62-54393

[51] Int. Cl.$^5$ ............................. F16D 25/00
[52] U.S. Cl. ................... 192/87.18; 192/52; 251/206
[58] Field of Search ............ 192/87.18, 52, 85 R, 192/109 F; 251/205, 206

[56] References Cited

U.S. PATENT DOCUMENTS 4,422,536 12/1983 Shatuck ............... 192/109 F X
4,560,044 12/1985 Nagata ............... 192/109 F X
4,653,533 3/1987 Tanigawa et al. ........... 192/109 F

FOREIGN PATENT DOCUMENTS 534068 6/1976 Japan .
52-6866 1/1977 Japan .
54-33345 10/1979 Japan .

Primary Examiner—Randolph A. Reese
Assistant Examiner—Franco S. DeLiguori
Attorney, Agent, or Firm—Armstrong, Nikaido, Marmelstein, Kubovcik & Murray

[57] ABSTRACT

A modulation valve device comprising an inlet passage, an outlet passage selectively connected to one of a plurality of hydraulic clutches through a selector valve, an operation chamber to which the inlet and outlet passages connect, a plunger to be moved in accordance with a pressure in the operation chamber, an accumulator controllably connected to the outlet passage through a passage whose opening degree is controlled by the plunger, and a variable orifice mechanism associated to the inlet passage. The variable orifice mechanism includes a plurality of orifices which have different flow resistances and are adapted to form a part of the inlet passage, respectively. A control mechanism is provided for selecting the orifice forming a part of the inlet passage among a plurality of the orifices in accordance with the selected clutch.

2 Claims, 1 Drawing Sheet

MODULATION VALVE DEVICE

BACKGROUND OF THE INVENTION

1. Field of the Invention

The present invention relates to a modulation valve device associated to a hydraulic clutch systems in industrial vehicles and others, and more particularly, to a modulation valve associated to clutch systems including various clutches for various speed ranges of the vehicles, so as to smoothly increase a hydraulic pressure to the clutch after the speed range is switched from a certain range to another range.

2. Description of the Prior Art

Generally, such a modulation valve comprises an accumulator and an orifice. The orifice is disposed in an inlet oil passage between an operation chamber of the modulation valve and a hydraulic source. When the selector valve is switched to a clutch-engaging position, the orifice restricts the flow of the operation oil into the operation chamber to prevent rapid increase of the pressure in the clutch.

It is desirable to change the control characteristics for increasing the hydraulic pressure in accordance with the selected speed range. More particularly, when the first speed range clutch is engaged, it is desirable to slowly increase the hydraulic pressure to surely prevent the shock during the engaging operation. When a high speed range (e.g., 3rd range) clutch is engaged, it is desirable to relatively rapidly increase the pressure so as to prevent a harmful slip of the clutch and a time delay before the complete engagement of the clutch.

However, the conventional structure includes only one orifice, which acts regardless of the selected range or position, so that the pressure characteristics are not changed.

Therefore, it is impossible in the conventional structures to set the pressure control characteristics suitable to all of the speed ranges. For example, if the orifice is designed to obtain the pressure control characteristics suitable to the first speed range, it is impossible to obtain the characteristics suitable to the second and third speed ranges.

Accordingly, it is an object of the present invention to provide a modulation valve device, overcoming the abovenoted disadvantages, which includes a variable orifice mechanism for selectively setting the characteristics of the orifice in accordance with the selected speed range.

SUMMARY OF THE INVENTION

According to the invention, a modulation valve device comprises an inlet passage adapted to be connected to a hydraulic pressure source; an outlet passage adapted to be selectively connected to one of a plurality of hydraulic clutches through a selector valve; an operation chamber to which the inlet and outlet passages connect; a plunger facing the operation chamber and adapted to be moved in accordance with a pressure in the operation chamber; an accumulator controllably connected to the outlet passage through a passage means of which opening degree is controlled by the plunger; a variable orifice mechanism associated with the inlet passage and including a plurality of orifices which have different flow resistances and are adapted to align a part of the inlet passage, respectively; and a control mechanism for selecting the orifice aligning a part of the inlet passage among a plurality of the orifices in accordance with the hydraulic clutch selected by the selector valve.

In the embodiment of the invention, the variable orifice mechanism includes a plunger which is movable transversely to the inlet passage and is provided with a plurality of orifices. The control mechanism includes a control chamber for hydraulically moving the plunger of the variable orifice mechanism and a connecting passage connecting at least one of the passages between the selector valve and the hydraulic clutches to the control chamber.

According to the structures described above, when the selector valve is switched to an engaging position of a certain clutch, the orifice corresponding to the selected clutch aligns with the inlet passage to restrict the inflow of the oil into the operation chamber, so that the pressure control characteristics are set appropriate to the selected clutch to be engaged.

BRIEF DESCRIPTION OF THE DRAWING

Embodiments of the invention will now be described by way of example only, with reference to the accompanying drawings, in which.

DETAILED DESCRIPTION OF THE PREFERRED EMBODIMENTS

Figure 1:
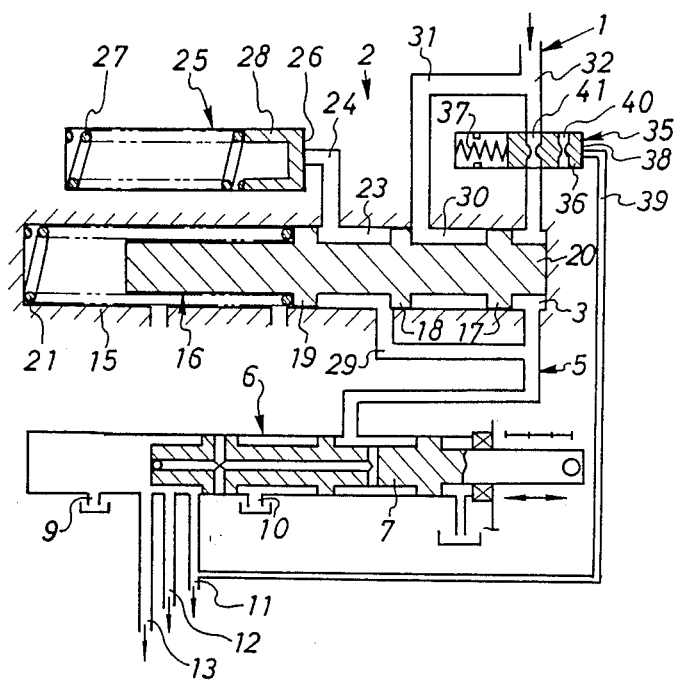
FIG. 1 is a schematic sectional view of an embodiment of the invention.

Referring to FIG. 1, an inlet passage 1 has an inlet (not shown) connected to a hydraulic pressure source and an outlet connected to an operation chamber 3 of a modulation valve 2. An outlet passage 5 is also connected to the operation chamber 3. An outlet of the outlet passage 5 is connected to a selector valve 6. The selector valve 6 is of well know type and includes a linearly shiftable spool 7. The selector valve 6 has a plurality of outlets which connect to drain passages 10 and 9 and clutch passages 11, 12 and 13, respectively. The clutch passages 11, 12 and 13 are connected to first, second and third speed range clutches (not shown), respectively. The spool 7 is adapted to be shifted by a well known appropriate operating mechanism (not shown) for selectively connecting the passage 5 to one of the clutch passages 11, 12 and 13 or closing the passage 5 with respect to all of the passages 11, 12 and 13.

The modulation valve 2 essentially comprises a cylinder 15 and a plunger 16 slidably fitted therein. The plunger 16 includes three lands 17, 18 and 19 which are spaced in the axial direction of the plunger 16. When the plunger 16 is in contact at an end 20 thereof with an end wall of the cylinder, as shown in FIG. 1, the operation chamber 3 is formed around the end 20, and the land 17 adjacent to the end 20 is opposed to the operation chamber 3. The land 19 adjacent to the other end forms a spring seat. A compressible coil spring 21 is disposed between the spring seat and the other end wall of the cylinder.

In the illustration position, a chamber 23 between the lands 19 and the intermediate land 18 connects to an accumulation chamber 26 in an accumulator 25 through a passage 24. A plunger 28 in accumulator 25 is urged by a spring 27 toward chamber 26. In the illustrated position, the accumulation chamber 26 has a minimum volume. The chamber 23 is also connected to the outlet passage 5 through a passage 29.

In the illustrated position, a chamber 30 between the lands 17 and 18 is connected to a portion 32 of the inlet passage 1 through the passage 31. Between the portion 32 and the operation chamber 3, a variable orifice mechanism 35 is associated to the inlet passage 1.

The variable orifice mechanism 35 includes a plunger 36 fitted into the cylinder, a spring 37 urging the plunger 36 in one direction and an operation or control chamber 38 for urging the plunger 36 in the opposite direction. The control chamber 38 is connected to a first speed clutch passage 11 through a connecting passage 39.

The plunger 36 is provided with two longitudinally spaced orifices 40 and 41, which are parallel or coaxial to the inlet passage 1 and extend through the plunger 36 in the diametral direction thereof. The orifice 40 has a flow resistance larger than that of the orifice 41.

The operation of the modulation valve is as follows:

In the illustrated position, the selector valve 6 is set at a neutral position to close the outlet passage 5. When the selector valve 6 is switched to the first speed position, the outlet passage 5 connects to the first speed clutch passage 11, so that the operation oil flowing into the outlet passage 5 from the inlet passage 1 through the operation chamber 3 flows into the clutch operation chamber (not shown) of the first speed clutch through the passage 11 and also flows into the connecting passage 39. Thus, the plunger 36 is urged toward the spring 37 when the first speed clutch starts to engage in accordance with the increase of the pressure in the clutch operation chamber.

In this operation, the operation oil flowing into the chamber 3 flows through the orifice 40 as detailed later, so that the amount of the oil supplied into the clutch passage 11 is restricted. A part of the oil flowing from the operation chamber 3 into the outlet passage 5 flows through the passage 29, the chamber 23 and the passage 24 into the accumulation chamber 26. This also restricts the amount of the oil supplied into the clutch passage 11. Therefore, the rapid increase of the pressure in the clutch operation chamber is prevented.

In the switching operation from the neutral position to the first clutch engaging position, the pressure can be particularly slowly increased to prevent the shock during the engaging operation, as detailed below.

Before the switching, the plunger 36 is maintained at the illustrated position so that the orifice 41 connects to the inlet passage 1. When the pressure in the clutch passage 11 slightly increases immediately after the switching operation, the pressure is supplied from the clutch passage 11 through the connecting passage 39 into the operation chamber 38, so that the plunger 36 moves to connect the orifice 40 having a relatively large resistance to the inlet passage 1, and thus the amount of the inflow of the oil into the clutch operation chamber 3 is remarkably restricted. Consequently, the pressure in the operation chamber in the clutch relatively slowly increases to engage the clutch without a shock.

In accordance with the increase of the pressure in the clutch operation chamber described above, the pressure in the operation chamber 3 also increases to move the plunger 16 toward the spring 21. When the pressure in the clutch operation chamber exceeds a predetermined value, the passage 24 is shut off from the passage 29 and the inlet passage 1 is connected to the outlet passage 5 not through the orifice 40 but through the passage 31, the chamber 30 and the passage 29. Therefore, when the clutch nearly completely engages, high pressure oil is rapidly supplied into the clutch operation chamber, and thus the clutch will rapidly and completely engage.

When the selector valve 6 is switched from a lower speed range to a higher speed range, e.g., from 1st to 2nd, or from 2nd to 3rd, the plungers 16, 28, 36 return to the illustrated neutral positions, and then operate in the manner similar to that described before, respectively. However, when the valve 6 is switched from the 2nd speed to 3rd speed, the pressure is not supplied from the clutch passage 11 into the operation chamber 38, so that the plunger 36 urged by the spring 37 occupies the position in which the orifice 41 connects to the inlet passage 1, and thus the orifice 41 having a relatively small flow resistance forms a part of the inlet passage 1. Consequently, the clutch pressure increases relatively rapidly without a time delay before complete engagement and harmful slip in the clutch.

Figure 2:
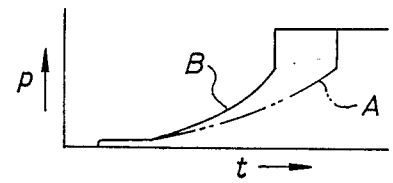
FIG. 2 is a graph illustrating pressure control characteristics.

FIG. 2 is a graph illustrating pressure control characteristics A in the operation chamber of the first speed clutch and pressure control characteristics B in the operation chamber of the second speed clutch. The abscissa t indicates the time and the ordinate p indicates the hydraulic pressure. The difference between the pressure characteristics for the first and second speed ranges is clear According to the present invention, as described hereinabove, since the modulation valve mechanism 2 comprises the variable orifice mechanism 35 including the orifices 40 and 41 to be selected in accordance with the clutch to be engaged, the hydraulic pressure characteristics can be appropriately set in accordance with each clutch.

In the illustrated embodiment, the variable orifice mechanism 35 includes orifices 40 and 41. However, if the clutch system includes three (as in the illustrated embodiment) or more clutches, three or more kinds of the orifices may be provided in the plunger 36, so that the respective different orifices are selected in accordance with the selected clutches. In this case, an orifice control mechanism, i.e., a plunger driving mechanism, may utilize a solenoid cooperating with the selector valve 6. The plunger 36 may be provided with two or more pressure receiving portions, which have different pressure receiving areas or different pressure receiving directions, and control chambers facing to the different pressure receiving portions may be connected to different clutch passages, respectively.

As described hereinabove, the present invention can be advantageously utilized in the hydraulic clutch system, e.g., for switching the speed ranges in the industrial vehicles, which are desired to change the pressure control characteristics in accordance with the selected speed range.

What is claimed is:

1. A modulation valve device comprising:
   an inlet passage adapted to be connected to a hydraulic pressure source;
   an outlet passage adapted to be selectively connected to one of a plurality of hydraulic clutches through a selector valve and passages between said selector valve and said hydraulic clutches;
   an operation chamber to which said inlet and outlet passages connect;
   a plunger facing to said operation chamber and adapted to be moved in accordance with a pressure in said operation chamber; an accumulator controllably connected to said outlet passage through a passage means of which opening degree is controlled by said plunger;

a variable orifice mechanism associated with said inlet passage and including a plurality of orifices having different flow resistance and are adapted to align with said inlet passage, respectively; and a control mechanism for selecting said orifice forming a part of said inlet passage among a plurality of said orifices in accordance with said hydraulic clutch selected by said selector valve, said variable orifice mechanism including a plunger which is movable laterally with respect to said inlet passage and is provided with said plurality of orifices; and said control mechanism includes a control chamber for hydraulically moving said plunger to said variable orifice mechanism and a connecting passage connecting at least one of said passages between said selector valve and said hydraulic clutches to said control chamber.

2. A modulation valve device of claim 1 wherein said connecting passage is connected to one of said clutch passages constituting a clutch for lower speed driving, and said plunger of said variable orifice mechanism is adapted to be moved by the hydraulic pressure supplied into said control chamber from one of said clutch passages of said clutch for lower speed driving to a position in which one of said plurality of orifices having a larger flow resistance aligns with the inlet passage.

* * * * *